US011637930B1

(12) United States Patent
Sprague et al.

(10) Patent No.: US 11,637,930 B1
(45) Date of Patent: *Apr. 25, 2023

(54) CALL ROUTING SYSTEM

(71) Applicant: United Services Automobile Association (USAA), San Antonio, TX (US)

(72) Inventors: Samantha Sprague, Glendale, AZ (US); Kelly Condon, Phoenix, AZ (US); Merrill Madsen, Anthem, AZ (US); Austin Jenkins, Phoenix, AZ (US); Mark Cook, Anthem, AZ (US); Conor Wroble, Chandler, AZ (US)

(73) Assignee: United Services Automobile Association (USAA), San Antonio, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/724,612

(22) Filed: Apr. 20, 2022

Related U.S. Application Data

(63) Continuation of application No. 16/837,943, filed on Apr. 1, 2020, now Pat. No. 11,349,990.

(60) Provisional application No. 62/828,310, filed on Apr. 2, 2019.

(51) Int. Cl.
*H04M 3/00* (2006.01)
*H04M 5/00* (2006.01)
*H04M 3/523* (2006.01)
*G06N 20/00* (2019.01)
*H04M 3/42* (2006.01)
*H04L 12/66* (2006.01)

(52) U.S. Cl.
CPC .......... *H04M 3/5232* (2013.01); *G06N 20/00* (2019.01); *H04M 3/42059* (2013.01)

(58) Field of Classification Search
CPC ............. H04M 3/5175; H04M 3/5191; H04M 3/5232; H04M 3/5233; H04M 3/5166; H04M 3/5183; H04M 2201/40; H04M 3/5235; H04M 3/5141; H04M 3/4936; H04M 2201/41; H04M 3/42221; H04M 2203/556; H04M 2203/402; H04M 2203/401; G10L 15/22; G10L 25/63; G10L 15/26; G10L 17/00; G10L 2015/088; G10L 15/1815; G10L 25/72; G10L 25/51; G10L 15/08; G10L 25/90; G06F 40/30; G06F 2203/011
USPC ............ 379/265.09, 265.06, 265.11, 265.12, 379/265.13

See application file for complete search history.

(56) References Cited

U.S. PATENT DOCUMENTS

| 7,046,789 B1 | 5/2006 | Anderson et al. |
| 8,130,935 B1 * | 3/2012 | Coughlan ........... H04M 3/5232 379/265.06 |
| 9,148,512 B1 | 9/2015 | Kumar et al. |

(Continued)

*Primary Examiner* — Kharye Pope
(74) *Attorney, Agent, or Firm* — Potomac Law Group, PLLC (57) ABSTRACT

Call routing technology can route a current call from a person based on an analysis of call data related to a prior call from the same person. For example, based at least on a customer satisfaction score determined from call data related to a prior call, a call routing server can identify one or more persons to whom a current call from the same person should be routed. Next, the call routing server can route the current call to one of the identified customer service representatives.

20 Claims, 6 Drawing Sheets

(56) References Cited

U.S. PATENT DOCUMENTS

| | | | |
|---|---|---|---|
| 9,955,021 B1* | 4/2018 | Liu | H04M 3/5232 |
| 11,349,990 B1 | 5/2022 | Sprague et al. | |
| 2008/0152122 A1* | 6/2008 | Idan | H04M 3/5175 |
| | | | 379/265.07 |
| 2008/0189171 A1 | 8/2008 | Wasserblat et al. | |
| 2013/0223612 A1 | 8/2013 | Flockhart et al. | |
| 2014/0081687 A1* | 3/2014 | Flockhart | G06Q 10/06 |
| | | | 705/7.13 |
| 2014/0220526 A1* | 8/2014 | Sylves | G06Q 10/06395 |
| | | | 434/238 |
| 2015/0195406 A1 | 7/2015 | Dwyer et al. | |
| 2016/0352900 A1* | 12/2016 | Bell | H04M 3/5175 |
| 2017/0187880 A1* | 6/2017 | Raanani | H04M 3/5232 |
| 2019/0158671 A1* | 5/2019 | Feast | G06Q 10/10 |
| 2020/0137231 A1* | 4/2020 | Revanur | H04M 3/5175 |

\* cited by examiner

| | Metric | Call From Customer 1 | Call From Customer 2 |
|---|---|---|---|
| 302 | Hold Time | 12 seconds | 19 minutes |
| 304 | Call Count | 1 call | 3 calls |
| 306 | Transfers | 1 transfer | 4 transfers |
| 308 | Avg. Positive Sentiment | 0.71 | 0.21 |
| 310 | Avg. Negative Sentiment | 0.02 | 0.40 |
| 312 | Max Positive Sentiment | 0.74 | 0.67 |
| 314 | Max Negative Sentiment | 0.51 | 0.82 |
| 316 | End Call Sentiment | Positive | Negative |

| | Determined Score | Call From Customer 1 | Call From Customer 2 |
|---|---|---|---|
| 318 | Overall Customer Satisfaction Score | 0.75 | 0.30 |

*FIG. 3*

Experience Scores

| Employee ID | Topic 1 | Topic 2 | Topic 3 | ... | Topic_n |
|---|---|---|---|---|---|
| CSR1 | 0.8 | 0.5 | 0 | | 0 |
| CSR2 | 0 | 0 | 0.7 | | 0.9 |
| CSR3 | 0.2 | 0.3 | 0.8 | | 0.7 |
| . | . | . | . | . | . |
| . | . | . | . | . | . |
| CSR_n | 0.5 | 0.6 | 0.3 | | 0 |

FIG. 6

CALL ROUTING SYSTEM

CROSS-REFERENCE TO RELATED APPLICATIONS

This application is a continuation of U.S. patent application Ser. No. 16/837,943, filed on Apr. 1, 2020, entitled "CALL ROUTING SYSTEM," which is a non-provisional of and claims priority to U.S. Provisional Application No. 62/828,310, filed on Apr. 2, 2019, entitled "CALL ROUTING SYSTEM," both of which are hereby incorporated by reference in their entireties for all purposes.

TECHNICAL FIELD

This disclosure is directed generally to systems, methods, and apparatus for routing calls.

BACKGROUND

When a person calls an organization's customer service phone number, he or she is routed to a customer service representative. To talk to the customer service representative, the call routing system may request the person identify the reason for his or her call. In some cases, the call routing system may provide some options such as dialing a number for an option related to complaints. The call routing system may also request the person to enter some identifying information about him or her, such as a member number or a birthdate. After the person enters the requested information, the call routing system typically routes the person to the next available customer service representative.

The techniques introduced here may be better understood by referring to the following Detailed Description in conjunction with the accompanying drawings, in which like reference numerals indicate identical or functionally similar elements. Moreover, while the technology is amenable to various modifications and alternative forms, specific embodiments have been shown by way of example in the drawings and are described in detail below. The intention, however, is not to limit the technology to the particular embodiments described. On the contrary, the technology is intended to cover all modifications, equivalents, and alternatives falling within the scope of the technology as defined by the appended claims.

DETAILED DESCRIPTION

A conventional call routing system can randomly route a person's call to a next available customer service representative based on a reason for the person's call. For instance, the conventional call routing system can request a person to identify a reason for his or her call and can determine that the person is calling about credit card fraud. Based on this reason, the conventional call routing system can randomly select a next available customer service representative within the credit card fraud department to answer the person's call. In some cases, such a random routing may provide a positive outcome for the person, but in some cases, the person may have a negative experience with the randomly selected customer service representative. By randomly routing the call to an available customer service representative, a conventional call routing system cannot predict whether its routing will result a good experience for the person.

Furthermore, at the end of a phone calk the conventional call routing system may present an option to a person to take a survey that provides information as to whether the person had a positive experience or a negative experience. However, most people do not take the survey, reducing the sample size of the customers used to determine a metric (e.g., customer satisfaction score) that describes a probability of whether customers had a positive or negative phone call experience. Moreover, the few people who do take the survey are typically either extremely satisfied or extremely dissatisfied, which does not provide representative data for customer satisfaction.

To overcome at least some of the issues described above for a conventional call routing system, this patent document describes systems, apparatus, and methods for routing calls based on analyzing a person's prior phone call conversation with a customer service representative. Such a technique can provide a better measure of customer satisfaction score without relying on customer surveys that tend to be ineffective, skewed, or both. The example headings for the various sections below are used to facilitate the understanding of the disclosed subject matter and do not limit the scope of the claimed subject matter in any way. Accordingly, one or more features of one section can be combined with one or more features of another section.

I. Determine Customer Satisfaction Score

Figure 1:
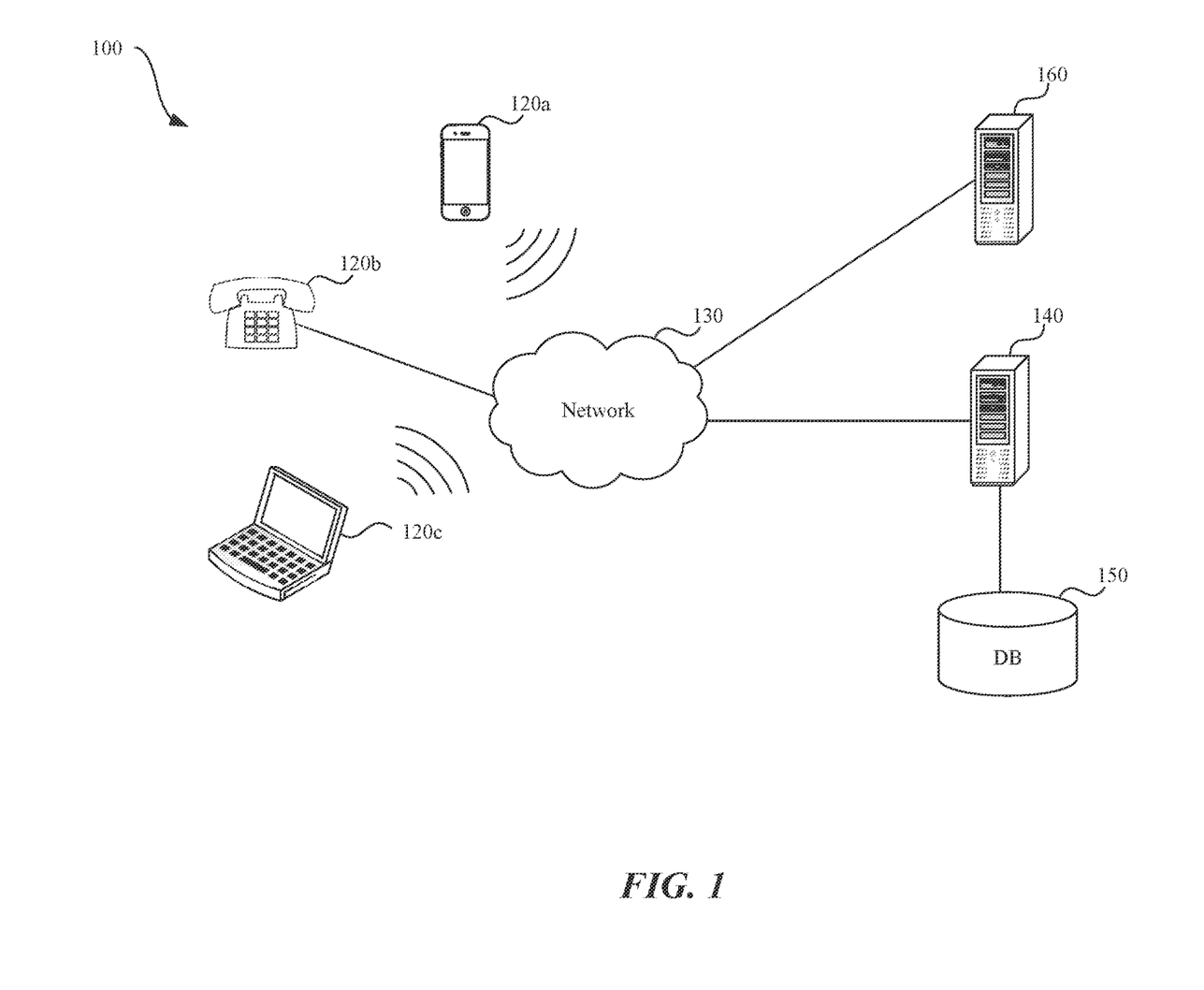
FIG. 1 shows an example of a call routing system.

FIG. 1 shows an example of a call routing system 100 that includes user devices 120a-120c that can call a number to talk to customer service representatives at a customer call center. The calls from the user devices 120a-120c can be sent to or can be managed by the call routing server 140. For example, a call initiated by a user device, such as a mobile device 120a, may be sent to a call routing server 140 via a communication network 130. The communication network 130 may include the Internet, a cellular network, a public switched telephone network (PSTN), a voice over Internet Protocol (VOIP) network, or any combination thereof. The call routing server 140 can include or can be connected to a database 150 that can store customer satisfaction scores for persons calling the customer call center. This patent document describes various operations performed by the call routing server 140. In some embodiments, a single server can perform the operations described for the call routing server 140. In some other embodiments, multiple servers can perform the operations described for the call routing server 140.

When a person calls a customer call center to speak to a customer service representative, the person can indicate a topic of conversation via a user device (e.g., a mobile phone). The person can provide the topic to an interactive Voice Response system (IVR) within call routing server 140 in some implementations. In an example banking use case, a topic may include (1) credit card, (2) insurance, (3) loans, (4) account status, etc. After the call routing server 140 routes the person's call to a customer service representative, a call analysis server 16 can record and analyze the person's conversation. The call analysis server 160 can also gather additional information such as an identifier that identifies the person. Examples of an identifier can include a member number, login information, or personal information (e.g., social security number or phone number) of the person.

Figure 2:
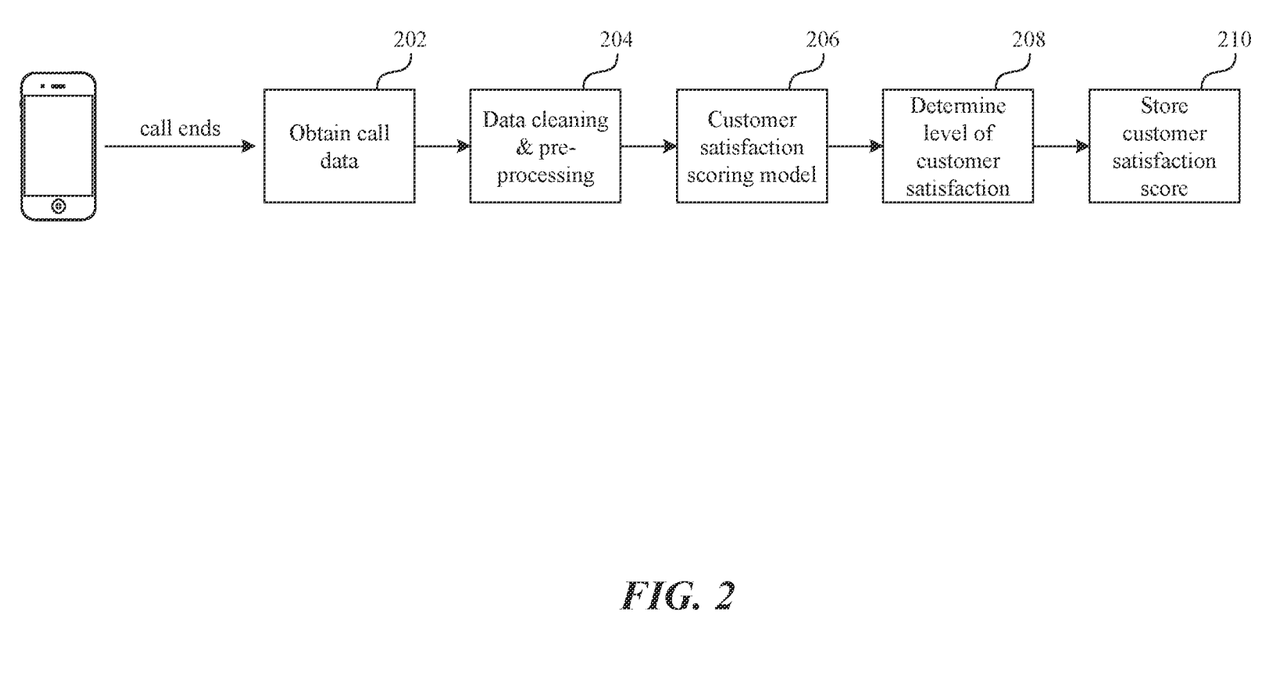
FIG. 2 shows an example process of determining a customer satisfaction score from call data.
Figure 3:
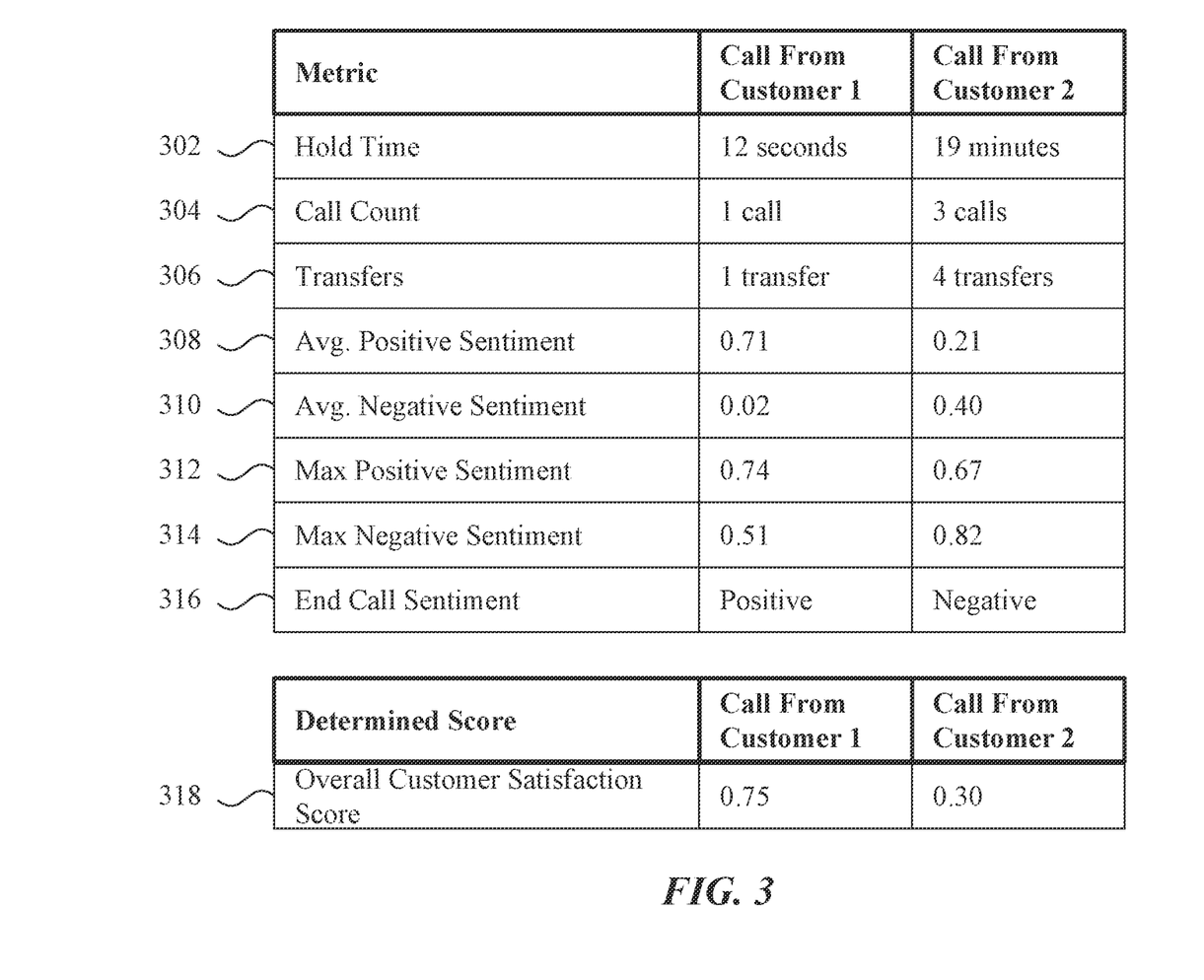
FIG. 3 provides some examples of metrics provided by a call analysis server and an overall customer satisfaction score determined by a call routing server.

The call analysis server 160 can analyze the recorded conversation and other call related information to provide a plurality of metrics (as further described in FIG. 3). In some embodiments, the call analysis server 160 can be operated or managed by a third-party vendor. The metrics can be determined using various algorithms and can analyze characteristics of the call such as the user's voice and changes in the user's voice (e.g., cadence, pitch, tone), choice of words, volume, among other characteristics. The call analysis server 160 provides to the call routing server 140 call data for each call. The call data can include the various metrics shown in the top table of FIG. 3, where the metrics can be used to characterize the person's experience on the call with the customer service representative. The call data can also include the identifier associated with the person. The call analysis server 160 sends the call data to the call routing server 140 via the communication network 130, where the call routing server 140 determines a customer satisfaction score based on the metrics provided in the call data. The process by which the call routing server 140 determines a customer satisfaction score is further described in this patent document specifically in FIG. 2.

The call routing server 140 can determine a customer satisfaction score after a person calls and speaks to a customer service representative based on the call data that the call routing server 140 receives from the call analysis server 160. The customer satisfaction score can be calculated as a probability that the person calling had a positive or negative experience (e.g., the customer satisfaction score can be a number between 0 and 1). Unlike customer surveys, one of the benefits of determining a customer satisfaction score is that each call can be analyzed to determine whether a person had a positive or negative experience. Another benefit of determining a customer satisfaction score is that it is not dependent on any additional action by a person calling the call center. In other words, unlike customer surveys, the call routing server 140 can determine the customer satisfaction score based on the call data obtained by the call analysis server 160 without any further input from the person calling the call center.

FIG. 2 shows an example process of determining a customer satisfaction score from call data. At operation 202, after a call ends, a call analysis server analyzes the content of the conversation between a person and a customer service representative. Based on its analysis, the call analysis server can provide to the call routing server certain call data. As mentioned above, call data can include an identifier of the person who called the customer call center. The call data also includes several metrics that can characterize the person's experience on the call, as shown in FIG. 3.

FIG. 3 provides some examples of metrics provided by a call analysis server and an overall customer satisfaction score determined by a call routing server. The table shown on top of FIG. 3 shows some example metrics gathered and analyzed by the call analysis server. The hold time metric 302 describes a time that the person is put on hold including time before the customer server representative answered the call (e.g., difference in time between a time when the person initiated a call and a time when a customer service representative answered the call) and/or the time the person was put on hold sometime during the call. The call count metric 304 describes a number of times that the person called within a pre-determined period (e.g., 1 hour, 1 week, 1 month) for the same topic selected by the person via one or more calls. The value for the call count metric 304 can be greater than or equal to one. For example, as shown in FIG. 3, Customer 2 called the customer all center three times to discuss the same topic. Thus, in this example, the value of the call count metric 304 for Customer 2 would be three. In some instances, this can identify the calls that have been dropped, requiting the person to call back.

The transfers metric 306 describes a number of times that the person is transferred from one customer service representative to another customer representative on one call. The value for the transfer metric 306 can be greater than or equal to zero, For example, a transfer metric of zero indicates that the person was routed to a customer service representative once during the call. In another example, as shown in FIG. 3, Customer 2 had a transfer metric of four, which indicates that Customer 2 was routed to five customer service representatives on one call.

The next five sentiment metrics 308-316 can be provided by the call analysis server. Call analysis server and/or the third party can determine the sentiment metrics 308-316 using, for example, analysis on the voice of the caller (e.g., cadence, tone, pitch, variation in speech), choice of words, volume of speech, and other characteristics. Such characteristics can be analyzed to determine sentiment metrics 308-316. The sentiment metrics 308-316 describe a sentiment of the person on the call. The average positive sentiment metric 308 describes an average of the positive sentiment values determined from multiple segments of the conversation between the person and the customer service representative. The average negative sentiment metric 310 describes an average of the negative sentiment values determined from multiple segments of the conversation between the person and the customer service representative.

The maximum positive sentiment metric 312 describes a maximum value from the positive sentiment values determined from multiple segments of the conversation between the person and the customer service representative. And, the maximum negative sentiment metric 314 describes a maximum value from the negative sentiment values determined from multiple segments of the conversation between the person and the customer service representative. Finally, the end call sentiment metric 316 indicates whether a sentiment during an end portion of the conversation of the call (e.g., last one-minute) was positive or negative.

In some implementations, the determination of the hold time metric 302, call count metric 304, transfers metric 306 can be different from that of the five sentiment metrics 308-316. The hold time metric 302, call count metric 304, transfers metric 306 for a person can be determined over a period of time (e.g., a week), whereas the five sentiment metrics 308-316 can be determined for the most-recent call from the person. A benefit of having hold time metric 302, call count metric 304, and transfers metric 306 be determined over a period of time is that it can provide a better gauge or metric of an overall customer experience. In other implementations, the call count metric 304 is the only metric that spans more than the single call. In some implementations, the metrics except for the call count are averaged over a number of calls, except that the call count is the number of times the user called regarding the same topic (i.e., not an average of the total number of times the person called).

Returning to FIG. 2, after the call routing server receives the call data from the call analysis server at operation 202, the call routing server can perform an optional data cleaning and pre-processing operation 204. At the data cleaning and pre-processing operation 204, the call routing server can determine whether the call data is in a correct format. For example, at the data cleaning and pre-processing operation 204, the call routing server can rearrange the metrics the ensure that it is in the proper format to be processed by the call routing server at the scoring operation 208.

At the scoring operation 206, the call routing server can determine a customer satisfaction score based on the metrics (e.g., 302-316 in FIG. 3) received from the call analysis server. The customer satisfaction score can quantify a level of satisfaction of the person on the call. At the scoring operation 208, the call routing server can perform a supervised machine learning technique by setting up multiple targets. The targets can be labeled with examples of metrics and their corresponding values associated with a person having a high customer satisfaction score and a person having a low customer satisfaction score. These examples of known high customer satisfaction scores and low customer satisfaction scores can be used to determine a customer satisfaction score at operation 208 using the metrics received from the call analysis server.

For example, using the metrics provided in FIG. 3, the call routing server can determine that Customer 1's hold time metric 302 was only 12 seconds, the call count metric 304 was very low, the average positive sentiment was higher than a pre-determined value (e.g., 0.5) which can be considered high, the average negative sentiment was lower than the pre-determined value which can be considered low, and the end call sentiment metric 316 indicates that the call ended with a positive sentiment. In this example of the metrics associated with Customer 1, the call routing server can determine that the call with Customer 1 had an overall customer satisfaction score 318 of 0.75. In some implementations, the 0.75 translates to a 75% probability that the call was positive. In other embodiments, a score of 0.75 can simply be compared to a threshold and if it is above a threshold, the call was considered positive.

Similarly, the call routing server can separately analyze the metrics for Customer 2 to obtain an overall customer satisfaction score of 0.3. For example, the call routing server can determine that Customer 2's hold time metric 302 of 19 minutes was longer than an average or pre-determined value, Customer 2 called three times for the same topic over a pre-determined period, Customer 2 was transferred four times, and Customer 2 had a maximum negative sentiment score that is greater than a pre-determined value (e.g., greater than 0.80), which can be considered to be very high. Based on at least these metrics, the call routing server can determine that Customer 2 had a customer satisfaction score of 0.3. In some embodiments, the 0.3 translates to a 30% probability that the call was positive, indicating that the call was very likely a negative experience for the person.

Once the customer satisfaction score is determined, the call routing server performs the level of customer satisfaction operation 210. At operation 210, the call routing server can determine that the customer satisfaction score is indicative of a high level of satisfaction if the call routing server determines that the customer satisfaction score is greater than a pre-determined threshold value (e.g., 0.4). Similarly, the call routing server can determine that the customer satisfaction score is indicative of a low level of satisfaction if the call routing server determines that the customer satisfaction score is less than the pre-determined threshold value (e.g., 0.4).

At the storing operation 212, the call routing server can store the determined customer satisfaction score on a database 150 (shown in FIG. 1). In some embodiments, each topic or area has its own set of scores. In some embodiments, the scores may change based on demographics of the caller. For example, some groups (e.g., 25-30-year-olds) may be particularly sensitive to call hold times. Thus, if the caller is 28 and the call hold time is average (e.g., 30 seconds), this can be considered a low score for the caller and result in a lower overall customer satisfaction score.

II. Predictive Modeling for Routing Calls

Once a customer satisfaction score has been determined for a person using the techniques described in Section 1, a call routing server can perform mapping techniques to identify the best customer service representative to speak to the same person if he or she calls again. A first mapping technique can involve mapping a person on a current call to a customer service representative based on the person's customer satisfaction score from a prior call and based on the customer service representative's experience. A second mapping technique can involve mapping technique can involve mapping a people on a current call to a customer service representative based on the person's customer satisfaction score from a prior call and based on whether the customer service representative has had positive or negative experiences on recent calls with other persons.

Regarding the first mapping technique, when a person calls a customer call center, the person may use his or her user device to select a topic so that an indication of the selected topic is sent from the user device to the call routing server 140. In some embodiments, when the user calls a customer call center, the call routing server 140 may auditorily or visually present a plurality of topics on the user device via the call. There are several ways in which a user may indicate a topic for which he or she is calling. For example, the user may select one of the topics by pressing a number associated with that topic while being connected to the call routing server 140 via the call. In another example, the call routing server 140 may include an IVR that may allow a user to say the topic that he or she is calling about.

As part of the first mapping technique, the call routing server 140 can determine one or more customer service representatives to speak to the person based on the person's customer satisfaction score from a prior call and based on the one or more customer service representative's experience scores that indicate a level of experience of the customer service representative(s) with the selected topic. This patent document will first describe the experience scores below, and then how the customer satisfaction score and experience scores can be used to map a person to one or more customer service representatives.

The call routing server 140 can obtain from the database 150 the customer satisfaction score based on an identifier provided by the person on the current call. The call routing server 140 can obtain the experience scores for the customer service representative(s) from the database 140 based on the selected topic. Experience scores indicates a level of training or qualification of each customer service representative in a plurality of topics. By using experience scores for a topic, a call routing server 140 may identify one or more customer service representatives that are likely the most qualified to speak with a person about an issue related to that topic.

In some embodiments, the person may be routed to a customer service representative based on the person's particular metrics. For example, if the person (and/or people similarly situated to the person) tend to have a good experience despite a longer hold time, the person can be put on hold for a longer period of time to ensure that the call is routed to a customer service representative that is most likely to help the person despite a longer hold time.

Figure 4:
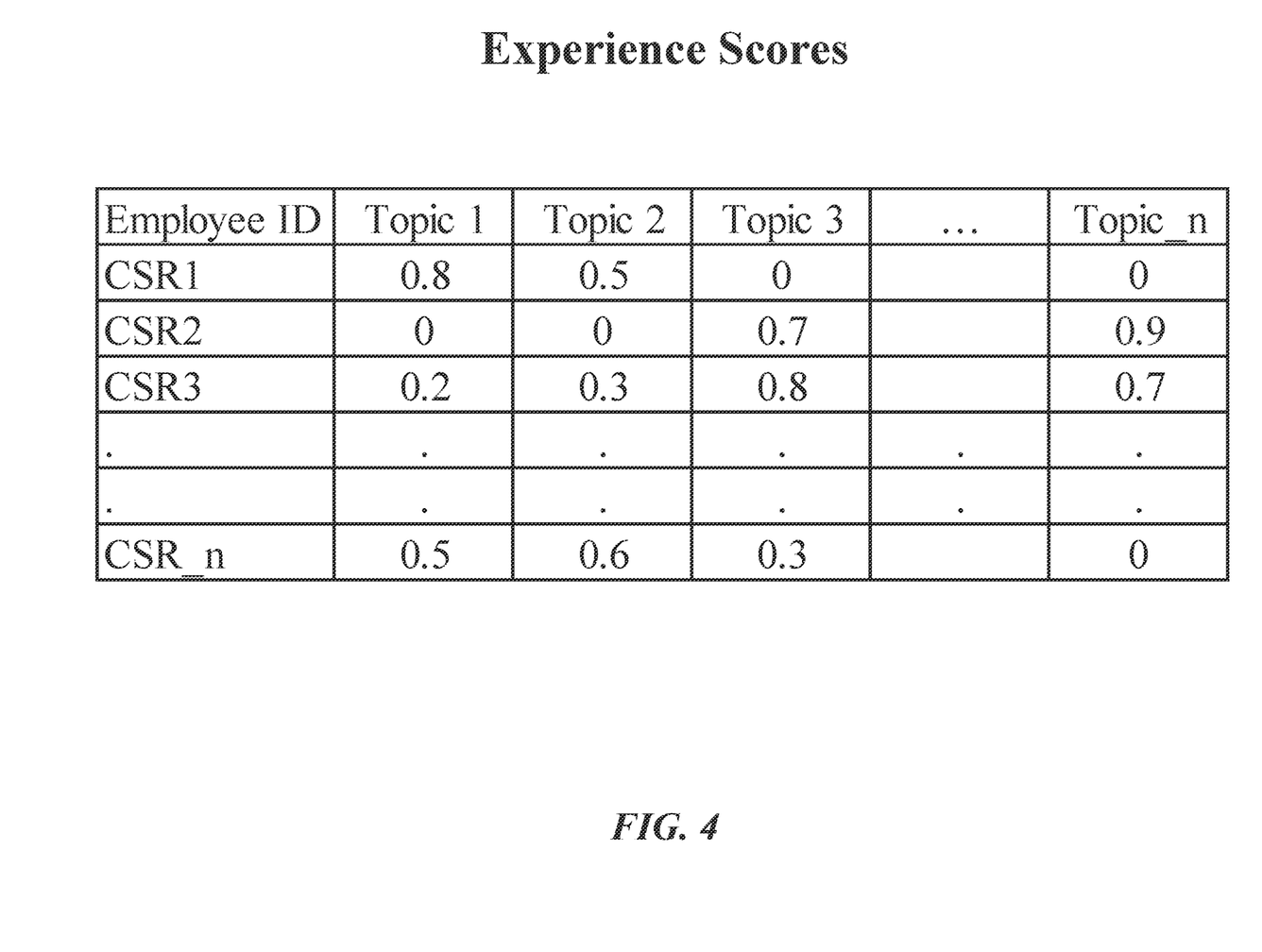
FIG. 4 shows an example experience score table for customer service representatives.

FIG. 4 shows an example experience score table for customer service representatives. The mapping table in FIG. 4 shows each customer service representative identified by his or her employee identifier (e.g.., CSR1, CSR, 2, etc.,) and associated with experience scores for the various topics. In the example shown in FIG. 2, the maximum experience score may be 1, the minimum experience score may be 0, and any experience score greater than or equal to 0.5 may indicate that a person is qualified to answer calls within that topic. The mapping table may be stored on the database 150 and can be accessed by the call routing server 140.

In some embodiments, the experience scores can be determined by a manager who can manually enter a customer service representative's experience scores with the various topics in an employment profile that may be stored on the database 150. In some embodiments, an experience score for a customer service representative may be based on a number of training classes that the customer service representative has attended for a topic. In some embodiments, an experience score for the customer service representative may be based on a number of years of experience that the customer service representative has in managing calls in a topic. In some embodiments, the experience scores for a customer service representative may be periodically updated (e.g., once every six months).

After the call routing server 140 obtains the experience scores for the one or more customer service representatives for a selected topic, the call routing server can determine whether the person who is currently calling has a low customer satisfaction score from a prior call. As mentioned in Section I, a customer satisfaction score can be considered to be a low level of satisfaction if the customer satisfaction score is less than a pre-determined value (e.g., 0.4). If the call routing server 140 determines that the person who is now calling has had a low customer satisfaction score from a prior call, the call routing server 140 can determine one or more customer service representatives having an experience score in the selected topic above a pre-determined experience threshold. For example, in FIG. 4 if the person selected Topic 1 (e.g., credit card transaction), and the person had a low customer satisfaction score, then the call routing server can identify that CSR1 having an experience score of 0.8 should speak to the person.

Regarding the second mapping technique, a call routing server 140 can map a person on a current call to a customer service representative based on the person's customer satisfaction score from a prior call and based on whether the customer service representative has had positive or negative experiences on recent calls with other persons. For example, if a person on a current call has had a high customer satisfaction score on a prior call, and if a first customer service representative has had a number of conversations (e.g., five) with other persons within a certain time period (e.g., 1 hour) that led to a low customer satisfaction scores, then the call routing server 140 can route the current call from the person to the first customer service representative. The call routing server 140 can determine that the first customer service representative qualifies for such a routing by determining that a number of conversations with low customer satisfaction scores exceeded a pre-determined limit (e.g., four) within the certain time period (e.g., one-hour).

In another example, and conversely, if a person on a current call has had a low customer satisfaction score on a prior call, and if a second customer service representative had had a number of conversations (e.g., six) with other persons within a certain time period (e.g., 1 hour) that led to a high customer satisfaction scores, then the call routing server 140 can route the current call from the person to the second customer service representative. The call routing server 140 can determine that the second customer service representative qualifies for such a routing by determining that a number of conversations with high customer satisfaction scores exceeded another pre-determined limit (e.g., five) within the certain time period (e.g., one-hour).

For both the first and second mapping techniques, after the call routing server 140 determines one or more customer service representatives to whom a current call should be routed, the call routing server 140 can send a message to the computer(s) associated with the determined or identified one or more customer service representative. The message indicates that the current call is mapped to the one or more customer service representatives. In some embodiments, if one of the identified customer service representative chooses to accept the call, the call routing server 140 can route the call to the customer service representative.

III. Customer Service Scoring to Provide Feedback

In some cases, if the call routing server 140 determines that a customer satisfaction score is very high or very low, the call routing server 140 may send a message to a manager who can acknowledge a customer service representative for a job well done or who can provide guidance to a customer service representative to improve his or her performance.

As mentioned in Section 1, a call routing server 140 can determine a level of customer satisfaction associated with a customer satisfaction score. The call routing server can determine that the customer satisfaction score is indicative of a high level of satisfaction if the call routing server determines that the customer satisfaction score is greater than a first pre-determined threshold value (e.g., 0.4); and the call routing server can determine that the customer satisfaction score is indicative of a low level of satisfaction if the call routing server determines that the customer satisfaction score is less than the first pre-determined threshold value. A call routing server 140 can determine that a customer satisfaction score is very high if the score is greater than a second pre-determined threshold value (0.8). Conversely, a call routing server 140 can determine that a customer satisfaction score is very low if the score is less than a third pre-determined threshold value (0.2)

In some embodiments, a call routing server 140 can send a message to a computer associated with the manager regarding a performance of a customer service representative. The call routing server 140 can generate and send this message if the call routing server determines that a customer satisfaction score was greater than the second pre-determined threshold value or less than the third pre-determined threshold value. The message can include the identifier of the customer service presentative, the metrics for the call obtained from the call analysis server, the determined customer satisfaction score, and/or the identity of the person to whom the customer service representative was speaking.

In some embodiments, the customer satisfaction scores associated with a customer service representative can be stored on database 150 for that customer service representative. By doing so, a call routing server 140 can provide to a manager historical performance of the customer service representative. For example, the call routing server can generate a timeline with the customer satisfaction scores for a customer service representative and send it to the computer associated with the manager. This timeline operation can be performed periodically (e.g., every 3 months) so that the manager can track a customer service representative's progress.

Figure 5:
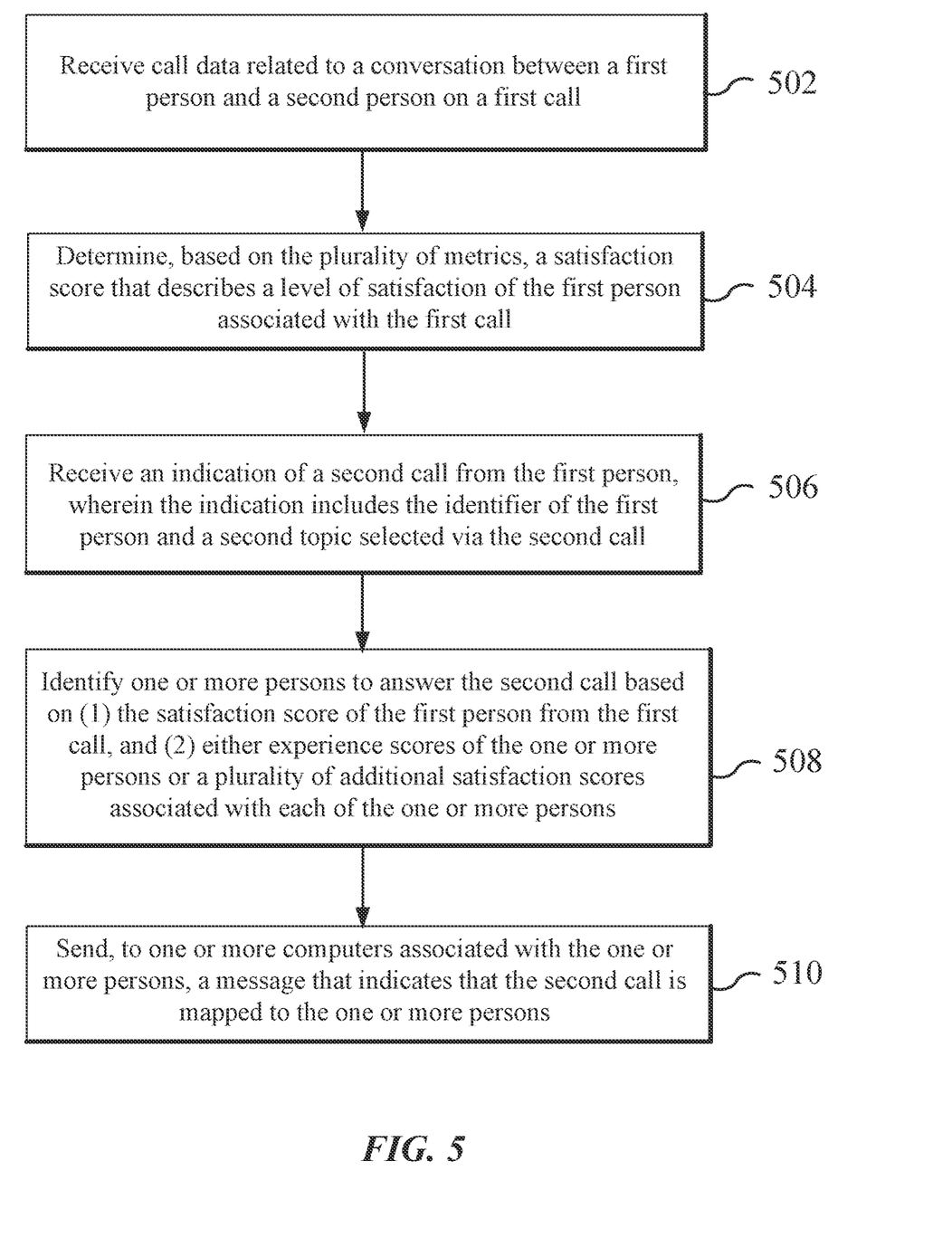
FIG. 5 shows an example flow diagram of a mapping technique for routing a call.

FIG. 5 shows an example flow diagram of a mapping technique for routing a call, At the receiving operation 502, a call routing server receives call data related to a conversation between a first person and a second person on a first call, wherein the conversation is related to a first topic selected by the first person via the first call. The call data includes an identifier that identifies the first person, and a plurality of metrics that characterize the first person's experience on the first call.

At the determining operation 504, the call routing server determines, based on the plurality of metrics, a satisfaction score that describes a level of satisfaction of the first person associated with the first call. The call routing server can determine that the level of satisfaction is a high level of satisfaction if the call routing server determines that the satisfaction score is greater than a pre-determined threshold value. The call routing server can determine that the level of satisfaction is a low level of satisfaction if the call routing server determines that the satisfaction score is less than the pre-determined threshold value. In some embodiments, the satisfaction score is determined by a supervised machine learning technique based on a plurality of targets, where a first set of targets includes a first set of values for the plurality of metrics associated with the high level of satisfaction, and where a second set of targets includes a second set of values for the plurality of metrics associated with the low level of satisfaction.

At the receiving operation 506, the call routing operation receives an indication of a second call from the first person. The indication includes the identifier of the first person and a second topic selected via the second call. In some embodiments, the first topics is same as the second topic.

At the identifying operation 508, the call routing server identifies or determines one or more persons to answer the second call based on: (1) the satisfaction score of the first person from the first call, and (2) either experience scores of the one or more persons or a plurality of additional satisfaction scores associated with each of the one or more persons. The experience scores indicate a level of experience of the one or more persons in the second topic. For each of the one or more persons, the plurality of additional satisfaction scores is determined from prior conversations on prior calls with a plurality of additional persons.

At the sending operation 510, the call routing server can generate and/or send, to one or more computers associated with the one or more persons, a message that indicates that the second call is mapped to the one or more persons. In some embodiments, sending operation 510 is simply a routing operation in which the call routing server routes the call to a selected representative.

In some implementations, when it is identified that the person calling has had a string of calls with low satisfaction scores, such information can be indicated to the customer service representative (e.g., displayed on his or her desktop).

In some embodiments, the plurality of metrics includes: a difference in time between a first time value when the first person initiates the first call and a second time value when the second person answers the first call, a first value that describes a number of times that the first person called regarding the first topic, wherein the first value is greater than or equal to one, a second value that describes a number of times that the first person is transferred from one person to another person on the first call, wherein the second value is greater than or equal to zero, a plurality of scores that describe a sentiment of the first person on the first call, and an indication of whether a sentiment during an end portion of the conversation of the first call was positive or negative. In some embodiments, the plurality of scores includes a first score that describes a maximum positive sentiment value, a second score that describes a maximum negative sentiment value, a third score that describes an average positive sentiment value, and a fourth score that describes an average negative sentiment value.

In some embodiments, the server is further configured to send a second message to a computer associated with a third person regarding a performance of the second person in response to determining that the satisfaction score is greater than or equal to a second pre-determined threshold value or is less than or equal to a third pre-determined threshold value, where the second pre-determined threshold value is greater than the pre-determined threshold value, where the third pre-determined threshold value is less than the pre-determined threshold value, and where the second message includes the satisfaction score.

In an example embodiment, the above-described methods are embodied in the form of processor-executable code and stored in a computer-readable program medium. Thus, a non-transitory machine-readable medium having machine executable instructions stored thereon that, when executed by one or more processors, direct the one or more processors to perform a method described for FIGS. 1 to 5, and/or in the various embodiments described in this patent document.

Figure 6:
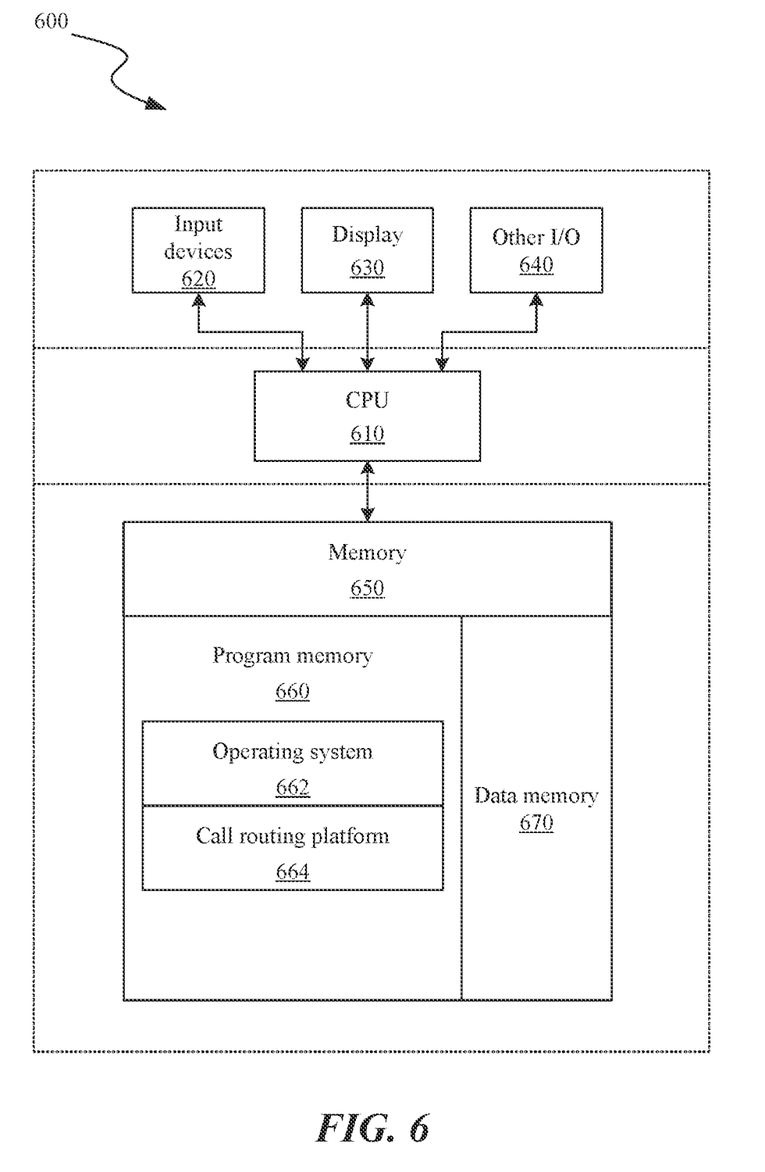
FIG. 6 is a block diagram illustrating an overview of devices on which some implementations of the call routing server can operate.

FIG. 6 is a block diagram illustrating an overview of devices on which some implementations of the call routing server can operate. The devices can comprise hardware components of a device 600, such as the call routing server that includes a call routing platform 664 that determines mapping between a current call from a person and a customer service representative based at least on a customer satisfaction score of the person from a prior call. Device 600 can include one or more input devices 620 that provide input to the CPU (processor) 610, notifying it of actions. The actions are typically mediated by a hardware controller that interprets the signals received from the input device and communicates the information to the CPU 610 using a communication protocol. Input devices 620 include, for example, a mouse, a keyboard, a touchscreen, an infrared sensor, a touchpad, a wearable input device, a camera- or image-based input device, a microphone, or other user input devices.

CPU 610 can be a single processing unit or multiple processing units in a device or distributed across multiple devices. CPU 610 can be coupled to other hardware devices, for example, with the use of a bus, such as a PCI bus or SCSI bus. The CPU 610 can communicate with a hardware controller for devices, such as for a display 630. Display 630 can be used to display text and graphics, In some examples, display 630 provides graphical and textual visual feedback to a person operating the device 600. In some implementations, display 630 includes the input device as part of the display, such as when the input device is a touchscreen or is equipped with an eye direction monitoring system. In some implementations, the display is separate from the input device. Examples of display devices are: an LCD display screen; an LED display screen; a projected, holographic, or augmented reality display (such as a heads-up display device or a head-mounted device); and so on. Other I/O devices 640 can also be coupled to the processor, such as a network card, video card, audio card. USB, FireWire or other external device, camera, printer, speakers, CD-ROM drive, DVD drive, disk drive, or Blu-Ray device.

In some implementations, the device 600 also includes a communication device capable of communicating wirelessly or wire-based with a network node (e.g., a server) or with a user device (e.g., a laptop, desktop, or mobile device) or with one or more computers e.g., desktop or laptop) associated with the customer service representatives. The communication device can communicate with another device or a server through a network using, for example, TCP/IP protocols. Device 600 can utilize the communication device to distribute operations across multiple network devices.

The CPU 610 can have access to a memory 650. A memory includes one or more of various hardware devices for volatile and non-volatile storage, and can include both read-only and writable memory. For example, a memory can comprise random access memory (RAM), CPU registers, read-only memory (ROM), and writable non-volatile memory, such as flash memory, hard drives, floppy disks, CDs, DVDs, magnetic storage devices, tape drives, device buffers, and so forth. A memory is not a propagating signal divorced from underlying hardware; a memory is thus non-transitory. Memory 650 can include program memory 660 that stores programs and software, such as an operating system 662 and call routing platform 664. The call routing platform 664 may include modules or processes or methods for routing a call by using the customer satisfaction score and mapping techniques described in Sections I-II and FIGS. 1-5 of this patent document. The call routing platform 664 may also include modules for performing the feedback operation as described in Section III and in FIG. 5 of this patent document. Thus, for example, the memory 650 may store instructions that upon execution by CPU 610 configure the device 600 to perform the operations described for the call routing server in FIGS. 1 to 5 and/or in the various embodiments described in this patent document. Memory 650 can also include data memory 670 that can include the various scores described in this patent document, which can be provided to the program memory 660 or any element of the device 600.

Some implementations can be operational with numerous other general purpose or special purpose computing system environments or configurations. Examples of well-known computing systems, environments, and/or configurations that may be suitable for use with the technology include, but are not limited to, personal computers, server computers, handheld or laptop devices, cellular telephones, portable electronic devices such as smartphones, wearable electronics, gaming consoles, tablet devices, multiprocessor systems, microprocessor-based systems, set-top boxes, programmable consumer electronics, network PCs, minicomputers, mainframe computers, distributed computing environments that include any of the above systems or devices, or the like.

Those skilled in the art will appreciate that the components illustrated in FIG. 1-6 described above, and in each of the flow diagrams, may be altered in a variety of ways. For example, the order of the logic may be rearranged, sub-steps may be performed in parallel, illustrated logic may be omitted, other logic may be included, etc. In some implementations, one or more of the components described above can execute one or more of the processes described above.

Conclusion

Unless the context clearly requires otherwise, throughout the description and the claims, the words "comprise," "comprising," and the like are to be construed in an inclusive sense, as opposed to an exclusive or exhaustive sense; that is to say, in the sense of "including, but not limited to." As used herein, the terms "connected," "coupled," or any variant thereof means any connection or coupling, either direct or indirect, between two or more elements; the coupling or connection between the elements can be physical, logical, or a combination thereof. Additionally, the words "herein," "above," "below," and words of similar import, when used in this application, refer to this application as a whole and not to any particular portions of this application. Where the context permits, words in the above Detailed Description using the singular or plural number may also include the plural or singular number respectively.

Several implementations of the disclosed technology are described above in reference to the figures. The computing devices on which the described technology may be implemented can include one or more central processing units, memory, user devices (e.g., keyboards and pointing devices), output devices (e.g., display devices), storage devices (e.g., disk drives), and network devices (e.g., network interfaces). The memory and storage devices are computer-readable storage media that can store instructions that implement at least portions of the described technology. In addition, the data structures and message structures can be stored or transmitted via a data transmission medium, such as a signal on a communications link. Various communications links can be used, such as the Internet, a local area network, a wide area network, or a point-to-point dial-up connection. Thus, computer-readable media can comprise computer-readable storage media (e.g., "non-transitory" media) and computer-readable transmission media.

As used herein, being above a threshold means that a value for an item under comparison is above a specified other value, that an item under comparison is among a certain specified number of items with the largest value, or that an item under comparison has a value within a specified top percentage value. As used herein, being below a threshold means that a value for an item under comparison is below a specified other value, that an item under comparison is among a certain specified number of items with the smallest value, or that an item under comparison has a value within a specified bottom percentage value. As used herein, being within a threshold means that a value for an item under comparison is between two specified other values, that an item under comparison is among a middle specified number of items, or that an item under comparison has a value within a middle specified percentage range.

As used herein, the word "or" refers to any possible permutation of a set of items. For example, the phrase "A, B, or C" refers to at least one of A, B, C, or any combination thereof, such as any of: A; B; C; A and B; A and C; B and C; A, B, and C; or multiple of any item, such as A and A; B, B, and C; A, B, C, and C; etc.

The above Detailed Description of examples of the technology is not intended to be exhaustive or to limit the technology to the precise form disclosed above. While specific examples for the technology are described above for illustrative purposes, various equivalent modifications are possible within the scope of the technology. For example, while processes or blocks are presented in a given order, alternative implementations may perform routines having steps, or employ systems having blocks, in a different order, and some processes or blocks may be deleted, moved, added, subdivided, combined, and/or modified to provide alternative or subcombinations. Each of these processes or blocks may be implemented in a variety of different ways. Also, while processes or blocks are at times shown as being performed in series, these processes or blocks may instead be performed or implemented in parallel, or may be performed at different times. Further any specific numbers noted herein are only examples: alternative implementations may employ differing values or ranges.

The teachings of the technology provided herein can be applied to other systems, not necessarily the system described above. The elements and acts of the various examples described above can be combined to provide further implementations of the technology. Some alternative implementations of the technology may include not only additional elements to those implementations noted above, but also may include fewer elements.

These and other changes can be made to the technology in light of the above Detailed Description. While the above description describes certain examples of the technology, and describes the best mode contemplated, no matter how detailed the above appears in text, the technology can he practiced in many ways. Details of the system may vary considerably in its specific implementation, while still being encompassed by the technology disclosed herein. As noted above, particular terminology used when describing certain features or aspects of the technology should not be taken to imply that the terminology is being redefined herein to be restricted to any specific characteristics, features, or aspects of the technology with which that terminology is associated. in general, the terms used in the following claims should not be construed to limit the technology to the specific examples disclosed in the specification, unless the above Detailed Description section explicitly defines such terms. Accordingly, the actual scope of the technology encompasses not only the disclosed examples, but also all equivalent ways of practicing or implementing the technology under the claims.

To reduce the number of claims, certain aspects of the technology are presented below in certain claim forms, but the applicant contemplates the various aspects of the technology in any number of claim forms. For example, while only one aspect of the technology is recited as a computer-readable medium claim, other aspects may likewise be embodied as a computer-readable medium claim, or in other forms, such as being embodied in a means-plus-function claim. Any claims intended to be treated under 35 U.S.C. § 112(f) will begin with the words "means for", but use of the term "for" in any other context is not intended to invoice treatment under 35 U.S.C. § 112(f). Accordingly, the applicant reserves the right to pursue additional claims after filing this application to pursue such additional claim forms, in either this application or in a continuing application.

We claim:

1. A method of routing a call, the method comprising:
   receiving call data related to a conversation of a first person on a first call, wherein the conversation is related to a first topic;
   determining a satisfaction score that describes a level of satisfaction of the first person associated with the first call;
   receiving an indication of a second call from the first person, wherein the indication includes an identifier of the first person and a second topic;
   identifying one or more persons to answer the second call based on:
   (1) the satisfaction score of the first person from the first call,
   (2) a training score of each of the one or more persons, wherein the training score indicates a level of training, of each of the one or more persons, in the second topic,
      wherein the training score is one of one or more training scores associated with one or more topics for each of the one or more persons,
      wherein the training score satisfies a criterion established, for each of the one or more persons, according to the satisfaction score of the first person from the first call, and
   (3) at least one satisfaction score associated with each of the one or more persons; and
   sending, to one or more computers associated with the one or more persons, a message that indicates that the second call is mapped to the one or more persons.

2. The method of claim 1, further comprising:
   determining that the level of satisfaction is high in response to the satisfaction score being greater than a pre-determined threshold value; and
   determining that the level of satisfaction is low in response to the satisfaction score being less than the pre-determined threshold value.

3. The method of claim 2, further comprising:
   sending a second message to a computer associated with a third person regarding a performance of a second person in response to determining that the satisfaction score is greater than or equal to a second pre-determined threshold value or is less than or equal to a third pre-determined threshold value,
   wherein the second pre-determined threshold value is greater than the pre-determined threshold value,
   wherein the third pre-determined threshold value is less than the pre-determined threshold value, and
   wherein the second message includes the satisfaction score.

4. The method of claim 1,
   wherein the satisfaction score is determined by a supervised machine learning technique based on a plurality of targets,
   wherein a first set of targets includes a first set of values for a plurality of metrics associated with a high level of satisfaction, and
   wherein a second set of targets includes a second set of values for the plurality of metrics associated with a low level of satisfaction.

5. The method of claim 1, wherein the call data includes a plurality of metrics that characterize an experience of the first person on the first call.

6. The method of claim 5, wherein the plurality of metrics includes:
   a difference in time between a first time value when the first person initiates the first call and a second time value when a second person answers the first call,
   a first value that describes a number of times that the first person called regarding the first topic, wherein the first value is greater than or equal to one,
   a second value that describes a number of times that the first person is transferred from one person to another person on the first call, wherein the second value is greater than or equal to zero,
   a plurality of scores that describe a first sentiment of the first person on the first call, and
   an indication of whether a second sentiment during an end portion of the conversation of the first call was positive or negative.

7. The method of claim 6, wherein the plurality of scores includes a first score that describes a maximum positive sentiment value, a second score that describes a maximum negative sentiment value, a third score that describes an average positive sentiment value, and a fourth score that describes an average negative sentiment value.

8. A non-transitory computer-readable medium storing instructions that, when executed by a computing system, cause the computing system to perform operations of routing a call, the operations comprising:
 receiving call data related to a conversation of a first person on a first call, wherein the conversation is related to a first topic;
 determining a satisfaction score that describes a level of satisfaction of the first person associated with the first call;
 receiving an indication of a second call from the first person, wherein the indication includes an identifier of the first person and a second topic;
 identifying one or more persons to answer the second call based on:
  (1) the satisfaction score of the first person from the first call,
  (2) a training score of each of the one or more persons, wherein the training score indicates a level of training, of each of the one or more persons, in the second topic,
  wherein the training score is one of one or more training scores associated with one or more topics for each of the one or more persons,
  wherein the training score satisfies a criterion established, for each of the one or more persons, according to the satisfaction score of the first person from the first call, and
  (3) at least one satisfaction score associated with each of the one or more persons; and
 sending, to one or more computers associated with the one or more persons, a message that indicates that the second call is mapped to the one or more persons.

9. The non-transitory computer-readable medium of claim 8, wherein the operations further comprise:
 determining that the level of satisfaction is high in response to the satisfaction score being greater than a pre-determined threshold value; and
 determining that the level of satisfaction is low in response to the satisfaction score being less than the pre-determined threshold value.

10. The non-transitory computer-readable medium of claim 9, wherein the operations further comprise:
 sending a second message to a computer associated with a third person regarding a performance of a second person in response to determining that the satisfaction score is greater than or equal to a second pre-determined threshold value or is less than or equal to a third pre-determined threshold value, wherein the second pre-determined threshold value is greater than the pre-determined threshold value,
  wherein the third pre-determined threshold value is less than the pre-determined threshold value, and
  wherein the second message includes the satisfaction score.

11. The non-transitory computer-readable medium of claim 8,
 wherein the satisfaction score is determined by a supervised machine learning technique based on a plurality of targets,
 wherein a first set of targets includes a first set of values for a plurality of metrics associated with a high level of satisfaction, and
 wherein a second set of targets includes a second set of values for the plurality of metrics associated with a low level of satisfaction.

12. The non-transitory computer-readable medium of claim 8, wherein the call data includes a plurality of metrics that characterize an experience of the first person on the first call.

13. The non-transitory computer-readable medium of claim 12, wherein the plurality of metrics includes:
 a difference in time between a first time value when the first person initiates the first call and a second time value when a second person answers the first call,
 a first value that describes a number of times that the first person called regarding the first topic, wherein the first value is greater than or equal to one,
 a second value that describes a number of times that the first person is transferred from one person to another person on the first call, wherein the second value is greater than or equal to zero,
 a plurality of scores that describe a first sentiment of the first person on the first call, and
 an indication of whether a second sentiment during an end portion of the conversation of the first call was positive or negative.

14. The non-transitory computer-readable medium of claim 13, wherein the plurality of scores includes a first score that describes a maximum positive sentiment value, a second score that describes a maximum negative sentiment value, a third score that describes an average positive sentiment value, and a fourth score that describes an average negative sentiment value.

15. A system comprising:
 one or more processors; and
 one or more memories storing instructions that, when executed by the one or more processors, cause the system to perform a process of routing a call, the process comprising:
  receiving call data related to a conversation of a first person on a first call, wherein the conversation is related to a first topic;
  determining a satisfaction score that describes a level of satisfaction of the first person associated with the first call;
  receiving an indication of a second call from the first person, wherein the indication includes an identifier of the first person and a second topic;
  identifying one or more persons to answer the second call based on:
   (1) the satisfaction score of the first person from the first call,
   (2) a training score of each of the one or more persons, wherein the training score indicates a level of training, of each of the one or more persons, in the second topic,
   wherein the training score is one of one or more training scores associated with one or more topics for each of the one or more persons,
   wherein the training score satisfies a criterion established, for each of the one or more persons, according to the satisfaction score of the first person from the first call, and
   (3) at least one satisfaction score associated with each of the one or more persons; and
  sending, to one or more computers associated with the one or more persons, a message that indicates that the second call is mapped to the one or more persons.

16. The system according to claim 15, wherein the process further comprises:
   determining that the level of satisfaction is high in response to the satisfaction score being greater than a pre-determined threshold value; and
   determining that the level of satisfaction is low in response to the satisfaction score being less than the pre-determined threshold value.

17. The system according to claim 16, wherein the process further comprises:
   sending a second message to a computer associated with a third person regarding a performance of a second person in response to determining that the satisfaction score is greater than or equal to a second pre-determined threshold value or is less than or equal to a third pre-determined threshold value,
   wherein the second pre-determined threshold value is greater than the pre-determined threshold value,
   wherein the third pre-determined threshold value is less than the pre-determined threshold value, and
   wherein the second message includes the satisfaction score.

18. The system according to claim 15,
   wherein the satisfaction score is determined by a supervised machine learning technique based on a plurality of targets,
   wherein a first set of targets includes a first set of values for a plurality of metrics associated with a high level of satisfaction, and
   wherein a second set of targets includes a second set of values for the plurality of metrics associated with a low level of satisfaction.

19. The system according to claim 15, wherein the call data includes a plurality of metrics that characterize an experience of the first person on the first call.

20. The system according to claim 19, wherein the plurality of metrics includes:
   a difference in time between a first time value when the first person initiates the first call and a second time value when a second person answers the first call,
   a first value that describes a number of times that the first person called regarding the first topic, wherein the first value is greater than or equal to one,
   a second value that describes a number of times that the first person is transferred from one person to another person on the first call, wherein the second value is greater than or equal to zero,
   a plurality of scores that describe a first sentiment of the first person on the first call, and
   an indication of whether a second sentiment during an end portion of the conversation of the first call was positive or negative.

* * * * *